Patented Apr. 11, 1944

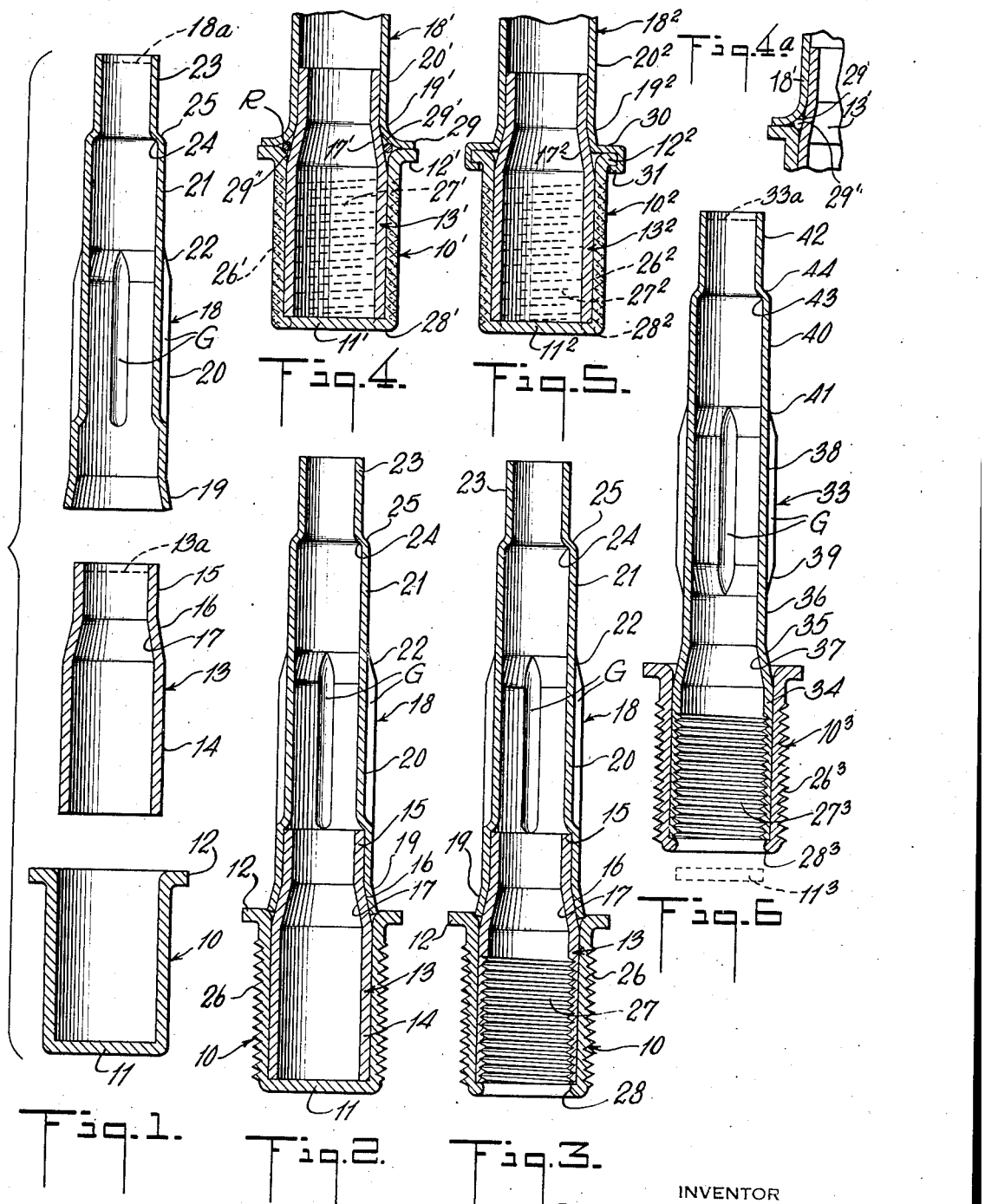

2,346,413

UNITED STATES PATENT OFFICE 2,346,413

METHOD OF MANUFACTURING INSERTS FOR VALVE STEMS

Lewis C. Broecker, Nichols, Conn., assignor to Bridgeport Brass Company, Bridgeport, Conn., a corporation of Connecticut Application January 20, 1942, Serial No. 427,402

7 Claims. (Cl. 29—157.1)

This invention relates to a method of manufacturing inserts for rubber valve stems.

An object of the invention is to manufacture such inserts from sheet metal instead of from solid bar as is the universal practice now. One of the advantages of utilizing sheet metal and the new process of manufacture is that steel as well as brass can be used advantageously inasmuch as machining or cutting operations are reduced to a minimum and scrap loss is very small.

Other objects, novel features and advantages of this invention will become apparent from the following specification and accompanying drawing, wherein Fig. 1 is a vertical longitudinal section showing the component parts of one form of construction;

Fig. 2 shows in similar section the component parts of the insert in assembled form;

Fig. 3 shows in similar section the completed insert made with the said parts;

Fig. 4 shows in similar fragmentary section a first modification in which one of the component parts has somewhat changed form;

Fig. 4a is a fragmentary section of the modification of Fig. 4 after heat has been applied to fuse the metal which joins the parts together;

Fig. 5 shows in similar fragmentary section a second modification in which the same component part has been further changed; and Fig. 6 shows in vertical longitudinal section a third modified form requiring only two component parts.

Referring first to Figs. 1 and 2, 10 denotes a cup-like or tubular member drawn from sheet steel or other suitable sheet metal. This member has an end closure 11 and an annular laterally extending flange 12 at its opposite open end. 13 denotes a second cup-like or tubular member drawn from the same material as cup-like member 10. The end closure 13a has been removed immediately after drawing. This tubular member has a portion 14 so admeasured as to interfit with the cup-like member 10, and a second portion 15 of reduced diameter joined to the portion 14 by a tapered portion 16 whose internal surface forms a valve seat 17.

A third drawn cup-like or tubular member 18 of the same material as member 10 is provided. The end closure 18a of this member is also removed directly after drawing. This third member 18 has a flared portion 19 shaped complementally to the outer surface of the tapered portion 16. A cylindrical portion 20 of reduced diameter is contiguous with the flared portion 19. This cylindrical portion 20 has an internal diameter substantially equal to the external diameter of the portion 15 of member 13 so that the tapered portion 16 and cylindrical portion 15 of member 13 may interfit respectively with the cylindrical portion 20 and the flared portion 19 of the third member 18.

A tubular cylindrical portion 21 of reduced diameter is joined to the portion 20 by a tapered portion 22. A third cylindrical portion 23 of still smaller diameter than portion 21 is provided contiguous with the latter with both an internal shoulder 24 and an external shoulder 25 at the junction of said two portions 21 and 23. All portions 19, 20, 22, 21 and 23 are, preferably, integral and adapted to engage with a rubber valve stem or the like.

The three members 10, 13 and 18 can all be drawn quickly and easily from sheet metal such as steel or brass. The end closures 13a and 18a of members 13 and 18 are removed after the drawing and prior to assembly. The end closure 11 is allowed to remain on the member 10 during the assembly operations for reasons which will hereinafter appear.

These three members are coated with a fusible metal. If of steel, they are each plated with a thin coating of copper. If of brass or other metal with a relatively low melting point, a coating of tin, zinc or lead is applied to each. The coatings are applied before the members are assembled, and have lower melting points than that of said members.

The coated members 10, 13 and 18 are assembled and interfitted as shown in Fig. 2 with the portion 14 of member 13 lying within member 10 and the portions 15 and 16 of member 13 interfitting with the respective portions 20 and 19 of member 18. After assembly the three parts are heated sufficiently to melt the coatings, preferably in a furnace with a neutral or controlled atmosphere. This causes the coatings on surfaces in contact to fuse together and the parts to be welded together securely.

Thereafter cap threads 26 are formed in the external surface of cup-member 10 either by rolling or in any other suitable way. During such application of the threads 26, the flange 12 and end closure 11 as well as the portion 14 of member 13 within said member 10 tend to keep the latter from collapsing. The threads 26 serve to receive a valve dust cap (not shown) or the like.

Thereafter the end closure 11 is pierced or drilled out or otherwise removed as shown in Fig. 3 and the member 13 provided with an internal thread 27 in its portion 14 either by tapping or in any other suitable way. The edges 28 of member 10 may then be suitably rounded. The internal threads serve to receive a valve inside of conventional or other suitable form.

The assembled insert is then ready for attachment thereto or engagement therewith of a rubber valve stem or the like (not shown) on portions of the member 18.

In the modification of Fig. 4, the members 10' and 13' are the same as members 10 and 13 of the construction of Figs. 1 to 3. Member 18' is structurally substantially identical with member 18 except that there an additional horizontal flange 29 is provided contiguous with the flared portion 19', the joint being rounded at 29' and defining with the rounded inner edge of the flange 12 an annular space 29" when the members 10', 13' and 18' are assembled in the same way as the parts 10, 13 and 18. Prior to the mounting of part 18' on part 13' an annular ring or band R is fitted on member 13'. When the parts are assembled this lies in the annular space 29". When the part 18' is mounted on part 20' of member 13' the flange 29' is forced into abutment with flange 12' of member 10'. If the parts are of steel the ring R is preferably of copper. If the parts are of brass, the ring R is preferably of silver solder which has a suitable flux associated therewith. Thereafter the assembled parts are heated sufficiently to melt the ring R, the melted metal being drawn by capillarity into the joints between the various parts and securely fastening the parts together as shown in Fig. 4a. In such treatment the flanges also are metallically secured either by the copper or silver solder. When such rings R are used, it is unnecessary to apply coatings to the members 10', 13' and 18'. Also, if the parts are of steel and the ring or band R is of copper, no flux is required because of the affinity these two metals have for each other. On the other hand, if no rings R are used, each of these parts must be coated with the same material as parts 10, 13 and 18. In such event, heating of the assembled parts causes the coatings to melt and the parts to be welded together securely, the flanges also then being welded together by the coating metal.

Thereafter, the external surface of member 10' is threaded at 26', the end closure 11' pierced or otherwise removed and member 13 internally threaded at 27' as with the modification of Figs. 1-3 inclusive.

In the modification of Fig. 5, the members 10² and 13² are the same as in the previously described modifications. Member 18² is structurally identical with member 18 except that an additional flange 30, larger than flange 29, is provided contiguous with the flared portion 19². Members 10², 13² and 18² are coated with the same coating as previously described or provided with a fusible metal ring R as described with respect to Fig. 4. The members 10², 13² and 18² are assembled in the same way as parts 10, 13 and 18 after being coated or provided with the ring R. Then a portion 31 of the flange 30 is bent around and under the flange 12² to mechanically secure the three members together. The so assembled parts are then heated as previously described to fuse the fusible ring R or coatings and weld the parts together as well. Thus the three parts 10², 13² and 18² are locked together mechanically as well as by the welded surfaces. Thereafter the external surface of member 10² is threaded at 26², the end closure 11² pierced or otherwise removed and member 13² internally threaded at 27² as with the modifications of Figs. 1-3 inclusive.

Figure 6 shows a further modification involving the use of only two separate parts instead of three. In this construction the cup-member 10³ is like that of the other modifications. Members 13 and 18, however, are replaced by a single cup-member 33 whose end closure 33a is removed after said member 33 has been drawn from suitable sheet metal and prior to assembly. Member 33 has a cylindrical portion 34 admeasured to interfit with the cup-member 10³. A tapered portion 35 joins portion 34 with a second cylindrical portion 36 of reduced diameter. Internally the tapered portion 35 provides a valve seat 37 similar to valve seat 17 of the first modification. A third cylindrical portion 38 of different diameter from that of portion 36 is joined by a tapered portion 39 to the second cylindrical portion 36. A fourth cylindrical portion 40 corresponding generally to the portion 21 of the first described modification is joined by a tapered portion 41 to the portion 40. A fifth cylindrical portion 42 of different diameter from that of portion 40 is provided contiguous with the latter with both an internal shoulder 43 and an external shoulder 44 defined at the junction of said two portions 40 and 42.

The member 33 can be drawn quickly from sheet metal of the same kind as previously mentioned. Its end closure 33a is pierced or removed after drawing and before use.

Before assembly, this member 33 is coated or plated at least on the outer surface of its portion 34 and, preferably, all over with the same type of coatings previously mentioned.

The coated members 10³ and 33 are assembled as shown in Fig. 6 with the portion 34 of member 33 fitting wholly within member 10³. Thereafter the assembled parts are heated as previously described to melt the coatings of surfaces in contact and to weld the parts together securely. Then the threads 26³ are rolled or otherwise formed on the outer surface of member 10³. The end closure of member 10³ is then drilled or pierced and the inner surface of portion 34 internally threaded at 27³ and the edge 28³ of member 10³ rounded. The completed insert is then ready for attachment to a rubber valve stem or the like to portions of the member 33.

The valve seats 17, 17', 17² or 37 can be reamed or otherwise finished after the internal threading of members 13 or 38 has been effected should it be necessary.

Instead of being rolled in, the threads 26, 26', 26² or 26³ may be applied to members 10, 10', 10² or 10³ by cutting or milling. In such event the closed ends 11, 11', 11² of the cup members 10, 10', 10² or 10³ are punched out or otherwise removed during the manufacture of such cups.

Each of members 10, 18', 18² and 33 may be provided with grooves G or projections (not shown) to permit holding or gripping of the assembled parts during threading of members 10, 10', 10² or 10³.

While specific embodiments of process and product have been shown and described herein, it is to be understood that variations in process steps and in structural detail within the scope of the appended claims is contemplated. There is no intention of limitation to the exact details shown and described.

What is claimed is:

1. That improvement in the process of preparing inserts for valve stems from sheet metal comprising, providing interfitting tubular members of sheet metal, one of said members having an end closure, coating surfaces of each of said members with a metallic coating having a lower melting point than that of said members, then assembling said members in interfitting relationship, with a surface of one in contact with a surface of another of said members, then heating the assembled members to melt the coatings on surfaces in contact with each other and to weld said members together, next shaping the external surface of said interfitting tubular member having an end closure to receive a dust cap, and thereafter removing said end closure, whereby said end closure serves as a temporary support during such preparation.

2. That improvement in the process of preparing inserts for valve stems from sheet metal comprising, providing interfitting tubular members of sheet metal, one of said members having an end closure, coating surfaces of each of said members with a metallic coating having a lower melting point than that of said members, then assembling said members in interfitting relationship, with a surface of one in contact with a surface of another of said members, next heating the assembled members to melt the coatings on surfaces in contact with each other and to weld said members together, then threading said one of said members externally, thereafter removing said end closure whereby said end closure serves as a temporary support during said threading, and threading another one of said members internally.

3. That improvement in the process of preparing an insert for a valve stem from sheet metal comprising, providing drawn first, second and third cup-like members of sheet metal each having an end closure, removing the end closures from said second and third cup-like members, coating surfaces of each of said members with a metallic coating having a lower melting point than that of said members, then assembling said three members with a portion of said second member lying within said first member and a portion of said second cup-like member lying within said third cup-like member, then heating the assembled members to melt the coatings and to weld said assembled members together, then threading said first cup-like member externally, thereafter piercing its end closure and threading said second cup-like member internally.

4. That improvement in the process of preparing an insert for a valve stem from sheet metal comprising, providing drawn tubular members of sheet metal, a first one of which having an end closure and also having a flange, a second one of which having a portion adapted to interfit with said first one, and a third one of which having a portion adapted to interfit with another portion of said second one, coating surfaces of each one of said members with a fusible metallic coating, then assembling said members in interfitting relationship with surfaces of said members in contact with each other, then heating the assembled members to melt the coatings on surfaces in contact with each other and to weld said members together, then rolling threads into an external surface of the first one of said members, its said end closure and flange serving to prevent collapse of the member during such rolling, then removing said end closure, and threading another of said members internally.

5. That improvement in the process of preparing an insert for a valve stem from sheet metal comprising, providing drawn tubular members, a first one of which has an end closure and also a flange, a second one of which also has a flange, and a third one of which has portions adapted to interfit with portions of said first and second ones, coating surfaces of each one of said members with a metallic coating having a lower melting point than that of said members, then assembling said members in interfitting relationship with surfaces of said members in contact with each other and with said two flanges in contact, then interlockingly engaging said two flanges, then heating the assembled members to melt the coatings on surfaces in contact with each other and to weld said members together, then rolling threads into an external surface of the first one of said members, its said end closure and flange serving to prevent collapse of the member during such rolling, then removing said end closure and threading the second one of said members internally.

6. That improvement in the process of preparing inserts for valve stems from sheet metal comprising, providing interfitting tubular members of sheet metal, one of said members having an end closure, providing fusible metal of lower melting point than that of said members for contact with surfaces of said members, then assembling said members in interfitting relationship, with a surface of one in contact with a surface of another and in contact with said fusible metal, then heating the assembled members to melt said fusible metal and with it welding said members together, next threading the external surface of said interfitting tubular member having an end closure, and thereafter removing said end closure whereby the latter serves as a temporary support during such threading.

7. That improvement in the process of preparing inserts for valve stems from sheet metal comprising, providing interfitting tubular members of sheet metal, one of said members having an end closure, then assembling said members in interfitting relationship and with a fusible metallic member in association therewith and with surfaces of all said members in contact with others thereof, then heating the assembled members to melt said fusible metallic member and with it welding the others of said members together, next threading the external surface of said interfitting tubular member having an end closure, and thereafter removing said end closure whereby the latter serves as a temporary support during such threading.

LEWIS C. BROECKER.